G. WILMOT.
RECORD FORM.
APPLICATION FILED NOV. 23, 1918.

1,339,995. Patented May 11, 1920.

UNITED STATES PATENT OFFICE.

GEORGE WILMOT, OF LINWOOD, MASSACHUSETTS.

RECORD-FORM.

1,339,995.   Specification of Letters Patent.   Patented May 11, 1920.

Application filed November 23, 1918. Serial No. 263,898.

*To all whom it may concern:*

Be it known that I, GEORGE WILMOT, a citizen of the United States, residing at Linwood, in the county of Worcester and State of Massachusetts, have invented a new and useful Record-Form, of which the following is a specification.

This invention relates to a record or order form to be used as part of a bookkeeping system capable of general use, but especially adapted for keeping track of the progressive filling of orders so as to show readily at all times how much of each article was ordered or required, and how much of the order has been filled so that it can be determined without difficulty what quantities of each item remain to be shipped.

Further objects and advantages of the invention will appear hereinafter.

Reference is to be had to the accompanying drawing which is a representation of a form either in the shape of a page of a book or a loose sheet arranged in accordance with this invention.

Although I describe the invention as relating particularly to the filling of orders and keeping the records thereof, I wish it to be understood that the invention is not limited to that particular purpose but is capable of general use.

It has been customary heretofore in factories manufacturing complicated machinery to keep records of each shipment of the numerous parts on a separate sheet. Then when it was necessary to find out how many parts had been shipped there was no way to do it except to go through all the sheets, tabulate the items relating to the particular part in question, and add up the numbers represented by them. The same problem arises in other connections, as will be obvious.

The object of this invention is to provide a single form so arranged that the quantity of the several articles or parts required for the filling of a complete order can be entered in a convenient place so as to be visible at all times and the quantity of each article or part going to make up each particular shipment can also be entered in such a way that it furnishes a complete record of the shipment, and also furnishes means for ascertaining almost instantly the total quantity of each article shipped up to any specified date. Therefore, the number still required to complete the order is readily ascertained.

Referring more particularly to the arrangement shown in the drawing, it will be seen that this sheet or form is provided with a space containing a heading 11 in which is a designation. For example the words "Spinning frames" indicate the subject of the order. This heading is shown as extended in the form of a column so as to indicate other machines which might be ordered for which the record might be used, as indicated by the words "Wet twisters," "Dry twisters," for example. A column is associated with it at the left in which a numeral is to be placed, as for example the numeral 10, indicating which machine and the number of machines, ordered or otherwise constitute the subject of the record. Places are made for other entries to show characteristics of the machines ordered, as appears at the right. These are shown to illustrate a complete record, although they can be varied according to the particular use to which the record is to be put.

Below the above described headings are a series of parallel inclined lines having spaces 12 between them which are provided with words constituting headings for the columns below. These columns are made up by vertical lines as is known in bookkeeping systems, and some of the headings are made slanting so that they can be read more easily than has been the case heretofore. In the first space I have shown the word "Number" to characterize the vertical column below. The columns are divided up by horizontal lines into horizontal rows of spaces, and the top row of spaces is separated from the others by a double line 13 and is provided with a designation at 14 at the left, as for example the word "Ordered" designating the entire horizontal row of spaces. The rows below are preferably provided with a designation, as for example "Shipped" at 15. It is to be observed that the column headings at 12 all designate parts of the several machines named in the headings 11 above, that is, those at the left of the double vertical line 16. In this case some of these headings name parts of spinning frames and some of them parts of twisters. This line 16 separates these columns from a series of columns at the right which are provided with headings at 17, as for example "Article," "Number," "Date shipped," "Car No.," etc., referring to specific shipments to be made below.

In the use of the record, say for example that ten spinning frames are ordered; the horizontal spaces at the tops of the columns opposite the space 14 are filled in to show the quantity or number of the several articles in these headings 12 relating to spinning frames that are required to fill the order completely. On the drawing I have shown under the heading "Frames set up" the numeral 10. 30 roller beams, 30 spindle rails, 120 ring rails, etc., are entered as constituting the complete order. These entries are all made clear across to the line 16 for this purpose. Those columns are left blank that are headed by words describing parts of twisters or any parts not to be furnished for this order.

Now, let it be assumed that a shipment is made containing 150 spindle brakes, 150 spindles, 250 large washers, 500 small washers, etc. These several entries are made in the columns below the line 13 under their respective headings, and the entries for a single shipment are made in one horizontal series of spaces, and in the columns at the right of the line 16 appropriate data are entered to show the necessary facts about that shipment, as for example, that it is packed in a barrel; numbered 1001; also the date shipped and the number of the car, and railroad, for example. Each complete shipment is entered in the same way, and at any given time it will be obvious that the total number of articles needed, as for example 740 spindle brakes, appears at the head of the column. To get the number that have been shipped at that time, it is necessary to add the figures below in that column, in the present case 350. Thus, an immense amount of time is saved in figuring up such matters and the record is always complete. It also takes the place of two or three records which have been used heretofore ordinarily.

It will be understood, of course, that the invention is not limited to keeping the records of parts of machines ordered and shipped, but is capable of being used for any set of records in which parts of a complete set of articles or the like are represented by different units corresponding to the different shipments specified here. Whatever the record that is to be kept may be, the vertical columns are appropriately designated at their heads for receiving in the spaces below data relating to different articles or subject matters. One row, as for example the top row of spaces across the top of the columns, is separated from the others and is reserved for receiving data indicating the total numbers required to form the complete record, while the others are adapted to receive data showing portions of the total number. A row of horizontal spaces having entries therein is intended to indicate one complete unit, as for example a shipment, and the sum of them vertically when the record is absolutely complete will equal the amounts indicated at the top of the columns.

These records can be made by building contractors, for shipping and receiving; by shipbuilders for shipping and receiving the enormous number of special pieces of dimension timbers and special sizes of steel work that are so frequently duplicated and at great cost; by aeroplane manufacturers, where they are shipping parts from various sections of the country to one objective assembling plant. This method will practically eliminate duplicate shipments through error.

It can also be used as a form for perpetual inventory by readjustment of the heads 11, putting the top heads down the side of the sheet and carrying the dates across the top of sheet at 12.

By the use of this record immense amounts of time are saved in keeping track of complicated orders and the like, because the time required for making the record is not even as long as that required for making ordinary records because no writing has to be done except the entry of the figures, but the principal saving in time lies in the fact that the ascertainment of the amount of each article remaining to be furnished is a matter that is almost instantaneous instead of taking up a great deal of time as heretofore.

Although I have illustrated and described the invention as applying to a particular problem in bookkeeping and shown a specific form of sheet or page, I am aware of the fact that it can be widely used and that the form of sheet or page can be altered accordingly, without departing from the scope of the invention as expressed in the claims.

Therefore I do not wish to be limited to all the details of construction herein shown and described, but what I do claim is—

1. A record form having a heading column with the names of several subjects printed therein, and delineated blank spaces adjacent thereto for receiving data indicating to which subject the record is to relate and the quantity, said form bearing columns provided with headings under said heading columns indicating all the parts or articles required to make up the complete subjects named in the heading column, and a row of spaces just under said headings designated by said headings to receive entries showing the entire number of parts or articles required to fill an order indicated in the blank spaces adjacent to the heading column.

2. A record form for keeping track of the progressive filling of orders having columns provided with headings appropriately designated for indicating the articles to which the entries to be made in the columns refer and rows of spaces along said columns divided from each other to receive entries showing the number of articles designated by said headings furnished with each shipment, whereby the number of each article already shipped will appear directly on the face of the form at all times, each of said complete rows of spaces having an additional alined row of spaces delineated beyond said headings and divided into columns and additional headings appropriately designating them to receive data relating to the shipments recorded in the first named rows.

3. An order sheet having intersecting columns and spaces, the columns being appropriately designated to receive in the spaces below data relating to articles ordered, one row of spaces across the top of the columns being separated from the others and appropriately designated for receiving entries indicating the total numbers of articles of each kind ordered, and a plurality of parallel rows of spaces below the same appropriately designated for showing the number shipped, each of the latter complete rows of spaces located to receive numerals indicating a single shipment, and having delineated spaces at one end thereof arranged in rows in alinement with said respective parallel rows and appropriately designated to receive data relating to the several shipments.

In testimony whereof I have hereunto affixed my signature.

GEORGE WILMOT.